US012722502B2

(12) United States Patent
Woo et al.

(10) Patent No.: US 12,722,502 B2
(45) Date of Patent: Sep. 1, 2026

(54) ELECTRIFIED VEHICLE AND METHOD OF CONTROLLING SAME WHILE BEING TOWED

(71) Applicants: Hyundai Motor Company, Seoul (KR); Kia Corporation, Seoul (KR)

(72) Inventors: Dong Hyeon Woo, Daegu (KR); Han Seung Myoung, Taean-gun (KR); Jeong Yeop Woo, Incheon (KR); Ye Eun Lee, Incheon (KR); Dong Hoon Lee, Suwon-si (KR); Seok Cheon Jeon, Seoul (KR); Joon Shik Park, Seoul (KR); Jin Kyeom Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 168 days.

(21) Appl. No.: 18/610,904

(22) Filed: Mar. 20, 2024

(65) Prior Publication Data

US 2025/0135907 A1 May 1, 2025

(30) Foreign Application Priority Data

Oct. 31, 2023 (KR) ........................ 10-2023-0148557

(51) Int. Cl.
*B60L 15/20* (2006.01)
*B60T 8/17* (2006.01)

(52) U.S. Cl.
CPC ........ *B60L 15/2009* (2013.01); *B60T 8/1708* (2013.01); *B60L 2240/12* (2013.01); *B60L 2240/423* (2013.01)

(58) Field of Classification Search
CPC ...... B60T 8/1755; B60T 8/248; B60T 13/586; B60T 8/1708; B60T 2230/06;
(Continued)

(56) References Cited

U.S. PATENT DOCUMENTS 4,232,910 A * 11/1980 Snyder .................. B60T 8/1708 303/123
6,516,925 B1 * 2/2003 Napier .................. B60T 8/1708 188/112 A (Continued)

FOREIGN PATENT DOCUMENTS

DE 10225120 A1 * 11/2003 ......... B62D 53/0871
DE 10244376 A1 * 2/2004 ............ B60T 13/746

(Continued)

OTHER PUBLICATIONS

EPO machine translation of De 10225120A1 (original DE document published Nov. 6, 2003) (Year: 2003).*

(Continued)

*Primary Examiner* — David A Testardi
(74) *Attorney, Agent, or Firm* — Slater Matsil, LLP

(57) ABSTRACT

An embodiment method of controlling an electrified vehicle includes, in a towing state of the electrified vehicle in which the electrified vehicle is moving by being towed by a towing vehicle, determining an optimal regenerative torque of a motor provided in the electrified vehicle based on a driving direction of the towing vehicle and a relative state between left and right wheels of the electrified vehicle and controlling the motor based on the optimal regenerative torque.

20 Claims, 5 Drawing Sheets

(58) Field of Classification Search
CPC ............... B60L 15/2009; B60W 30/02; B60W 30/18127; B60W 2300/14
See application file for complete search history.

(56) References Cited

U.S. PATENT DOCUMENTS

| | | | | |
|---|---|---|---|---|
| 10,611,247 | B1 | 4/2020 | Breen | |
| 11,007,894 | B2 | 5/2021 | Zenner et al. | |
| 11,472,418 | B2 | 10/2022 | Shin et al. | |
| 2002/0095251 | A1* | 7/2002 | Oh | B60T 8/246 701/41 |
| 2008/0169144 | A1* | 7/2008 | DeGrave | B60L 50/40 180/165 |
| 2012/0029782 | A1* | 2/2012 | Suda | B60T 8/1708 701/70 |
| 2012/0130573 | A1* | 5/2012 | Wu | B60T 8/17555 701/22 |
| 2012/0193889 | A1* | 8/2012 | Harrison | B60T 8/1764 701/79 |
| 2016/0318493 | A1* | 11/2016 | Drako | B60T 8/248 |
| 2018/0334038 | A1* | 11/2018 | Zhao | B60L 7/18 |
| 2019/0009760 | A1* | 1/2019 | Zenner | B60T 8/323 |
| 2021/0070263 | A1* | 3/2021 | Kono | B60T 8/1766 |
| 2022/0041170 | A1* | 2/2022 | Nishihashi | B60T 13/586 |
| 2022/0169085 | A1 | 6/2022 | Marmara et al. | |
| 2022/0388484 | A1* | 12/2022 | Salter | B60T 17/22 |
| 2022/0410853 | A1* | 12/2022 | Henderson | B60T 8/76 |
| 2023/0028030 | A1* | 1/2023 | Madineni | B60T 8/1708 |
| 2023/0090814 | A1* | 3/2023 | Murase | B60L 15/20 701/22 |
| 2023/0166700 | A1* | 6/2023 | Bennati | B60T 8/172 701/70 |
| 2023/0226866 | A1* | 7/2023 | Diamond | B60D 1/62 701/22 |
| 2024/0132146 | A1* | 4/2024 | Rinker | B62D 5/046 |
| 2024/0278785 | A1* | 8/2024 | Choi | B60W 30/188 |
| 2024/0286615 | A1* | 8/2024 | Salif | B60W 10/04 |

FOREIGN PATENT DOCUMENTS

| | | | | |
|---|---|---|---|---|
| DE | 102004036089 | A1 * | 2/2006 | B60D 1/30 |
| DE | 102009032754 | A1 * | 1/2011 | B60T 8/1755 |
| DE | 102019205156 | A1 * | 10/2020 | B60L 15/2036 |
| DE | 102019217610 | A1 * | 5/2021 | B60T 7/20 |
| EP | 1234739 | A2 * | 8/2002 | B60L 7/10 |
| GB | 2566492 | A * | 3/2019 | B60W 30/18127 |
| JP | 2003299205 | A | 10/2003 | |
| KR | 20230046048 | A | 4/2023 | |
| WO | WO-2020207638 | A1 * | 10/2020 | B60L 15/2036 |

OTHER PUBLICATIONS

EPO machine translation of DE 102019205156A1 (original DE document published Oct. 15, 2020) (Year: 2020).*

* cited by examiner

Torque(Nm)

E1
E2
E3
Speed(RPM)

ELECTRIFIED VEHICLE AND METHOD OF CONTROLLING SAME WHILE BEING TOWED

CROSS-REFERENCE TO RELATED APPLICATIONS

This application claims the benefit of Korean Patent Application No. 10-2023-0148557, filed on Oct. 31, 2023, which application is hereby incorporated herein by reference in its entirety.

TECHNICAL FIELD

The present disclosure relates to an electrified vehicle and a method of controlling the same while being towed.

BACKGROUND

Nowadays, as interest in the environment increases, the number of eco-friendly vehicles equipped with electric motors as a power source is increasing. Eco-friendly vehicles are also called electrified vehicles, and representative examples thereof are hybrid electric vehicles (HEVs) or electric vehicles (EVs).

The motor provided in the above electrified vehicle is able to charge a battery using the driving force of wheels during deceleration, which is called “brake energy regeneration” or “regenerative braking”. More specifically, when braking is required, the total brake amount (torque) according to the braking request is preferentially calculated, and regenerative braking may be performed using a motor within the total brake amount.

Although regenerative braking is generally performed in the situation in which a vehicle driving under its own power decelerates, a vehicle having a dead battery may perform regenerative braking by outputting regenerative torque through a motor while being towed by another vehicle.

However, in the situation where the vehicle is moving by being towed by another vehicle, the behavior of a vehicle body may become unstable due to external factors such as speeding or strong wind from the side, so it is necessary to propose a method to ensure stability in the towed state.

The foregoing described as the background is intended merely to aid in the understanding of the background of embodiments of the present disclosure and is not intended to mean that the embodiments of the present disclosure fall within the purview of the related art already known to those skilled in the art.

SUMMARY

The present disclosure relates to an electrified vehicle and a method of controlling the same while being towed. Particular embodiments relate to an electrified vehicle with improved driving stability while being towed by another vehicle and a method of controlling the same while being towed.

Embodiments of the present disclosure can solve problems in the prior art, and an embodiment of the present disclosure provides an electrified vehicle capable of improving driving stability and securing the efficiency of regenerative braking while moving by being towed by another vehicle and a method of controlling the same while being towed.

The technical subjects of embodiments of the present disclosure may not be limited to the above-mentioned technical subjects, and other technical subjects which are not mentioned may be clearly understood, through the following descriptions, by those skilled in the art to which the present disclosure pertains.

According to an embodiment of the present disclosure, a method of controlling an electrified vehicle while being towed may include determining, in a towing state in which a subject vehicle is moving by being towed by a towing vehicle, target regenerative torque of a motor provided in the subject vehicle on the basis of a driving direction of the towing vehicle and a relative state between left and right wheels of the subject vehicle and controlling the motor on the basis of the determined target regenerative torque.

For example, the towing state may be a state of continuously outputting regenerative torque through the motor in order to charge a battery connected to the motor, and the controlling of the motor may include adjusting the regenerative torque output through the motor on the basis of the target regenerative torque.

For example, the relative state between the left and right wheels of the subject vehicle may include a number of occurrences per unit time that a discrepancy transitions between positive and negative values through zero in a number of revolutions between the left and right wheels of the subject vehicle.

For example, the determining of the target regenerative torque may include determining the target regenerative torque on the basis of a first torque value determined in consideration of stability of vehicle body behavior if the driving direction of the towing vehicle is a straight driving direction and if the frequency of discrepancies exceeds a preset value.

For example, the first torque value may be determined by further considering a weight determined based on at least one of the vehicle speed of the subject vehicle, weather conditions, and surrounding object detection results.

For example, the determining of the target regenerative torque may include determining the target regenerative torque by further considering a second torque value determined in consideration of the efficiency of the motor.

For example, at least one of the first torque value and the second torque value may be determined with reference to an efficiency map preset for torque and speed of the motor.

For example, the method may further include controlling at least one of the vehicle speed and the wheel speed of the subject vehicle if the driving direction of the towing vehicle is a straight driving direction, if the frequency of discrepancies exceeds a preset value, and if the amplitude of at least one of the number of revolutions of the left wheel and the number of revolutions of the right wheel of the subject vehicle exceeds a preset threshold.

For example, the method may further include outputting a preset control signal to cause the subject vehicle to issue a warning if the driving direction of the towing vehicle is a straight driving direction, if the frequency of discrepancies exceeds a preset value, and if the amplitude of at least one of the number of revolutions of the left wheel and the number of revolutions of the right wheel of the subject vehicle exceeds a preset threshold.

For example, the determining of the target regenerative torque may include determining the target regenerative torque on the basis of a second torque value determined in consideration of the efficiency of the motor if the driving direction of the towing vehicle is not a straight driving direction or if the frequency of discrepancies is equal to or less than a preset frequency.

According to another embodiment of the present disclosure, an electrified vehicle may include a motor and a controller configured to determine, in a towing state in which a subject vehicle is moving by being towed by a towing vehicle, target regenerative torque of the motor provided in the subject vehicle on the basis of a driving direction of the towing vehicle and a relative state between left and right wheels of the subject vehicle and to control the motor on the basis of the determined target regenerative torque.

For example, the towing state may be a state of continuously outputting regenerative torque through the motor in order to charge a battery connected to the motor, and the controller may adjust the regenerative torque output through the motor on the basis of the target regenerative torque.

For example, the relative state between the left and right wheels of the subject vehicle may include a number of occurrences per unit time that a discrepancy transitions between positive and negative values through zero in a number of revolutions between the left and right wheels of the subject vehicle.

For example, the controller may determine the target regenerative torque on the basis of a first torque value determined in consideration of stability of vehicle body behavior if the driving direction of the towing vehicle is a straight driving direction and if the frequency of discrepancies exceeds a preset value.

For example, the first torque value may be determined by further considering a weight determined based on at least one of the vehicle speed of the subject vehicle, weather conditions, and surrounding object detection results.

For example, the controller may determine the target regenerative torque by further considering a second torque value determined in consideration of the efficiency of the motor.

For example, at least one of the first torque value and the second torque value may be determined with reference to an efficiency map preset for torque and speed of the motor.

For example, the controller may control at least one of the vehicle speed and the wheel speed of the subject vehicle if the driving direction of the towing vehicle is a straight driving direction, if the frequency of discrepancies exceeds a preset value, and if the amplitude of at least one of the number of revolutions of the left wheel and the number of revolutions of the right wheel of the subject vehicle exceeds a preset threshold.

For example, the controller may output a preset control signal to cause the subject vehicle to issue a warning if the driving direction of the towing vehicle is a straight driving direction, if the frequency of discrepancies exceeds a preset value, and if the amplitude of at least one of the number of revolutions of the left wheel and the number of revolutions of the right wheel of the subject vehicle exceeds a preset threshold.

For example, the controller may determine the target regenerative torque on the basis of a second torque value determined in consideration of the efficiency of the motor if the driving direction of the towing vehicle is not a straight driving direction or if the frequency of discrepancies is equal to or less than a preset frequency.

According to various embodiments of the present disclosure described above, it is possible to improve driving stability and secure the efficiency of regenerative braking while moving by being towed by another vehicle.

Advantageous effects obtainable from embodiments of the present disclosure may not be limited to the above-mentioned effects, and other effects which are not mentioned may be clearly understood, through the following descriptions, by those skilled in the art to which the present disclosure pertains.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
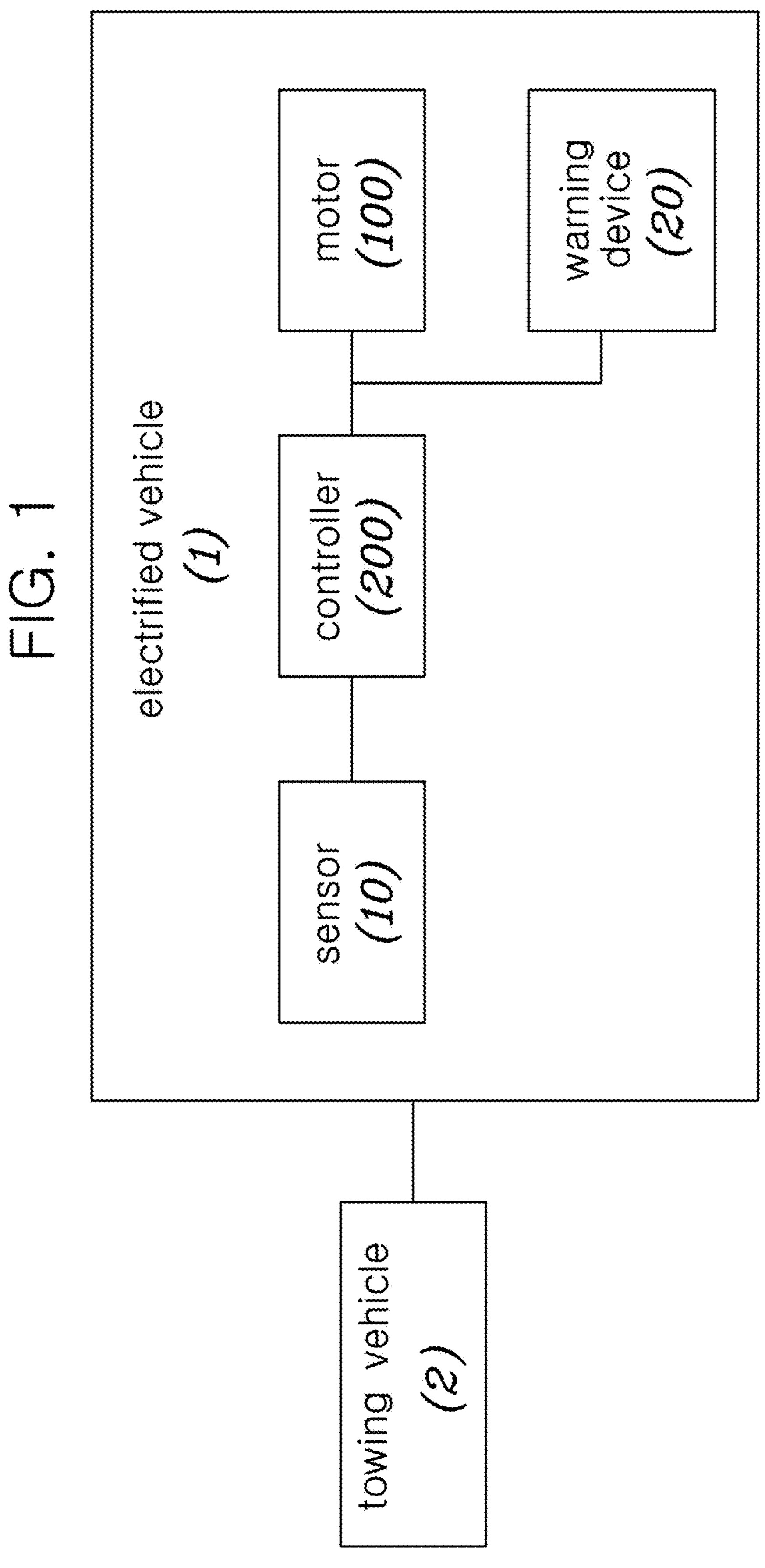
FIG. 1 is a diagram illustrating the configuration of an electrified vehicle according to an embodiment of the present disclosure.

A specific structural or functional description of embodiments of the present disclosure disclosed in the specification or application is given merely for the purpose of describing the embodiments according to the present disclosure. Therefore, the embodiments according to the present disclosure may be implemented in various forms, and the embodiments of the present disclosure should not be construed as being limited to the embodiments described in the specification or application.

Various changes and modifications may be made to the embodiments of the present disclosure, and therefore particular embodiments will be illustrated in the drawings and described in the specification or application. However, it should be understood that embodiments according to the concept of the present disclosure are not limited to the particular disclosed embodiments, but the embodiments of the present disclosure include all modifications, equivalents, and alternatives falling within the spirit and scope of the present disclosure.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art and are not to be interpreted to have ideal or excessively formal meanings unless clearly defined in the present disclosure.

Hereinafter, embodiments disclosed in the present specification will be described in detail with reference to the accompanying drawings, and the same or similar elements are given the same or similar reference numerals, so duplicate descriptions thereof will be omitted.

In the following description of embodiments, the term "predetermined" means that when a parameter is used in a process or algorithm, the value of the parameter is previously determined. The value of the parameter may be determined at the beginning of the process or algorithm or during a period when the process or algorithm is performed.

The terms "module" and "unit" used for the elements in the following description are given or interchangeably used in consideration of only the ease of writing the specification and do not have distinct meanings or roles by themselves.

In describing the embodiments disclosed in the present specification, when the detailed description of the relevant known technology is determined to unnecessarily obscure the gist of the embodiments of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the embodiments of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" is intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but it does not mean a generic function unit.

A controller may include a communication device configured to communicate with a sensor or another control unit, a memory configured to store an operation system, a logic command, or input/output information, and at least one processor configured to perform a determination, calculation, decision, or the like which are required for responsible function controlling.

Embodiments of the present disclosure may be variously modified and include various exemplary embodiments in which specific exemplary embodiments will be described in detail hereinbelow. However, it shall be understood that the specific exemplary embodiments are not intended to limit the embodiments of the present disclosure thereto, and the embodiments of the present disclosure cover all the modifications, equivalents, and substitutions which belong to the idea and technical scope of the embodiments of the present disclosure.

An electrified vehicle and a method of controlling the same while being towed according to embodiments of the present disclosure propose to determine target regenerative torque in consideration of the stability of the vehicle body behavior and the efficiency of a motor and control the motor on the basis of the same, thereby improving driving stability and ensuring regenerative braking efficiency in the towed state.

Hereinafter, an electrified vehicle according to an embodiment of the present disclosure will be described before explaining the control method in the towed state according to an embodiment of the present disclosure.

FIG. 1 is a diagram illustrating the configuration of an electrified vehicle according to an embodiment of the present disclosure.

Referring to FIG. 1, an electrified vehicle 1 according to an embodiment of the present disclosure may include a motor 100 and a controller 200, and it may further include a sensor 10 and a warning device 20, which may be an internal or an external warning device or both. Meanwhile, FIG. 1 primarily shows the elements related to the description of the present embodiment of the present disclosure, and it is obvious that the actual electrified vehicle is able to be implemented by including more or fewer elements.

The sensor 10 may include cameras such as a front camera provided at the front of a subject vehicle to capture the front driving environment, a side camera provided at the side of the subject vehicle to capture the lateral driving environment, and a rear camera provided at the rear of the subject vehicle to capture the rear driving environment, radar, lidar, a wheel sensor for detecting the rotation of wheels of the subject vehicle, a motor sensor for detecting the rotation speed of the motor, and the like.

The motor 100 may decelerate the vehicle by outputting torque in a direction opposite the driving direction, as well as accelerating the vehicle by outputting torque, and may charge a battery connected thereto by brake energy during the deceleration.

In a towing state in which the subject vehicle is moving by being towed by a towing vehicle, the controller 200 may determine target regenerative torque of the motor 100 provided in the subject vehicle, based on the driving direction of the towing vehicle and the relative state between the left and right wheels of the subject vehicle, and may control the motor 100 on the basis of the determined target regenerative torque.

In this case, the towing state may specifically indicate a state in which regenerative torque is continuously output through the motor 100 in order to charge the battery connected to the motor 100, and the controller 200 may adjust the regenerative torque output through the motor 100 on the basis of the target regenerative torque.

The relative state between the left and right wheels of the subject vehicle is intended to determine the stability of the subject vehicle's behavior and may include, for example, the frequency of discrepancies in the number of revolutions between the left and right wheels of the subject vehicle. However, the relative state between the left and right wheels of the subject vehicle is not necessarily limited thereto and may include various factors that may affect the vehicle body behavior due to the imbalance between the left and right wheels.

The driving direction of the towing vehicle may be determined through detection results of the sensor 10. For example, the driving direction of the towing vehicle may be determined according to the relationship between the towing vehicle and the lane recognized from the image captured by the front camera. Alternatively, the driving direction of the towing vehicle may also be determined based on information obtained through communication between the subject vehicle and the towing vehicle.

The frequency of discrepancies in the number of revolutions between the left and right wheels may also be determined through detection results of the sensor 10, and for example, the frequency of discrepancies in the number of revolutions between the left and right wheels may be determined by aggregating detection results of a plurality of wheel speed sensors for measuring the wheel speeds of the left and right wheels, respectively.

If the determined driving direction of the towing vehicle is a straight driving direction and if the frequency of discrepancies in the number of revolutions between the left and right wheels exceeds a preset value, the controller 200 may determine target regenerative torque on the basis of a first torque value determined in consideration of the stability of the vehicle body behavior.

In this case, the controller 200 may determine the first torque value with reference to a stability map preset for the torque and speed of the motor 100. The stability map may be produced based on vehicle test values, and the torque on the stability map may be motor torque converted from the wheel torque. This stability map may enable evaluation of the stability when the motor 100 outputs each torque value at the current vehicle speed.

If the frequency of discrepancies in the number of revolutions between the left and right wheels is high in the state in which the driving direction of the towing vehicle is a straight driving direction, the body of the towed subject vehicle is in an unstable state in which the vehicle body shakes left and right, so the target regenerative torque may be determined based on the first torque value determined in consideration of the stability of the vehicle body, thereby improving the behavioral stability of the subject vehicle.

In addition, the controller 200 may determine the first torque value by further considering a weight determined based on at least one of the speed of the subject vehicle, weather conditions, and surrounding object detection results. In this case, the speed of the subject vehicle may be determined based on the detection results of the wheel speed sensor, and the weather conditions may be determined through the detection results of the cameras or based on weather information, road information, or the like obtained through communication with the outside. In addition, the surrounding object detection results may be detection results from cameras, radar, or lidar. For example, the weight may be determined with reference to the table below.

TABLE 1

| Items | Weights | 0 | 0.5 | 1 |
|---|---|---|---|---|
| Vehicle speed | a | 70 kph or less | more than 70 kph and equal to or less than 100 kph | more than 100 kph |
| Weather conditions | b | Clear | Rain | Snow/Typhoon |
| Surrounding objects | c | None | Front detection (excluding towing vehicle) | Side/rear detection |

For example, the controller 200 may multiply the sum of the respective weights (a, b, and c) by the torque in the region with the highest stability among the torques corresponding to the current vehicle speed on the stability map, thereby determining the first torque value. Meanwhile, the controller 200 may determine the target regenerative torque by further considering the second torque value determined in consideration of the motor efficiency.

In this case, the second torque value may be determined with reference to an efficiency map preset for the torque and speed of the motor 100. The efficiency map may be produced based on vehicle test values, and this stability map may enable evaluation of the efficiency when the motor 100 outputs each torque value at the current vehicle speed.

The controller 200 may determine the target regenerative torque by aggregating the first torque value and the second torque value and, for example, determine, as the target regenerative torque, a greater value of the first torque value and the second torque value. In general, as the torque value increases, the vehicle body behavior may be stabilized, so the stability of the vehicle body behavior may be considered in priority over the efficiency of the motor 100 by determining the greater value among the first torque value and the second torque value to be the target regenerative torque.

Meanwhile, if the driving direction of the towing vehicle is a straight driving direction, if the frequency of discrepancies in the number of revolutions between the left and right wheels of the subject vehicle exceeds a preset value, and if the amplitude of at least one of the number of revolutions of the left wheel and the number of revolutions of the right wheel of the subject vehicle exceeds a preset threshold, the controller 200 may determine that the subject vehicle's behavior is unstable and control at least one of the vehicle speed and the wheel speed of the subject vehicle or output a preset control signal such that the subject vehicle issues a warning.

In this case, the vehicle speed of the subject vehicle may be reduced by controlling the torque of the motor 100, and for example, in this case, the controller 200 may control the motor 100 to output the maximum possible torque. In addition, the control of the wheel speed of the subject vehicle may be performed by control of brakes, for example, a traction control system (TCS) function, as well as control of the motor torque.

The subject vehicle may issue a warning according to a control signal output from the controller 200, and the warning may be output through the warning device 20 provided outside and/or inside the subject vehicle. For example, the warning device 20 may include a cluster, an AVN (Audio, Video, and Navigation) device, lights such as headlights and taillights, a horn, and the like, and guide occupants inside the subject vehicle, vehicles around the subject vehicle, or pedestrians to recognize the unstable behavior of the subject vehicle through the same.

Meanwhile, if the driving direction of the towing vehicle is not a straight driving direction or if the frequency of discrepancies in the wheel speed between the left and right wheels of the subject vehicle is equal to or less than a preset frequency, the controller 200 may determine the target regenerative torque on the basis of the second torque value determined in consideration of the efficiency of the motor 100.

If the driving direction of the towing vehicle is not a straight driving direction, that is, if the vehicle drives on a curved road, turns left or right, or makes a U-turn, the difference in the wheel speed between the left and right wheels is intended, and the behavior of the vehicle body is stable when the frequency of discrepancies in the wheel speed between the left and right wheels is lower, so the efficiency of regenerative braking may be further improved by considering the efficiency of the motor 100 in priority over stabilization of the behavior of the vehicle body.

Hereinafter, the process of determining the target regenerative torque of the motor 100 on the basis of the first torque value according to an embodiment of the present disclosure will be described with reference to FIG. 2.

Figure 2:
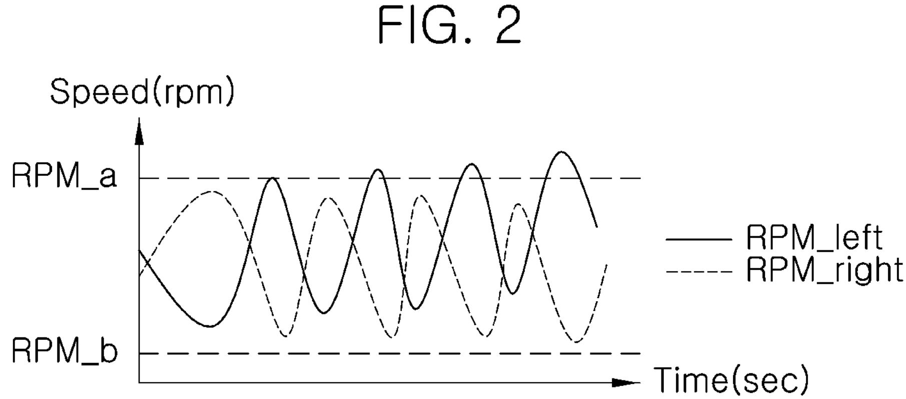
FIG. 2 is a diagram illustrating a process of determining an unstable state of vehicle body behavior according to an embodiment of the present disclosure.

FIG. 2 is a diagram illustrating a process of determining an unstable state of vehicle body behavior according to an embodiment of the present disclosure.

Referring to FIG. 2, the number of revolutions of the left wheel RPM_left and the number of revolutions of the right wheel RPM_right are shown on a graph having one axis of time and the other axis of wheel speed. In the graph in FIG. 2, the number of revolutions of the left wheel RPM_left and the number of revolutions of the right wheel RPM_right do not match each other repeatedly, instead of remaining in a matching state.

If the frequency of occurrence of the above discrepancy condition is equal to or greater than a preset frequency in the state in which the driving direction of the towing vehicle is a straight driving direction, the controller 200 may identify that the body behavior of the subject vehicle is unstable and determine the target regenerative torque on the basis of the first torque value.

Furthermore, if the amplitude of at least one of the number of revolutions of the left wheel and the number of revolutions of the right wheel exceeds a threshold RPM_a or RPM_b, the controller 200 may determine that the body behavior of the subject vehicle is unstable and control the vehicle speed and the wheel speed of the subject vehicle.

Hereinafter, the stability map and the efficiency map for determining the target regenerative torque according to an embodiment of the present disclosure will be described with reference to FIG. 3.

Figure 3:
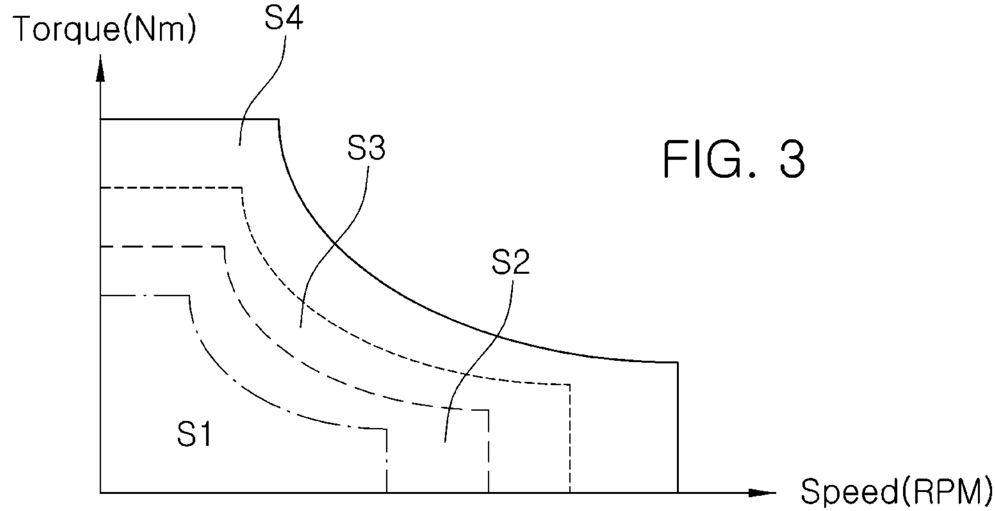
FIG. 3 is a diagram illustrating a stability map for determining a first torque value according to an embodiment of the present disclosure.

FIG. 3 is a diagram illustrating a stability map for determining a first torque value according to an embodiment of the present disclosure.

Referring to FIG. 3, the stability map may be set on a graph having one axis of motor speed and the other axis of motor torque, and it may be divided into a plurality of areas S1 to S4 depending on the degree of stability.

On the stability map shown in FIG. 3, the vehicle body behavior may be more stabilized as a value is closer to the area S4 from the area S1, and this stability map may enable determination of a torque value that is most advantageous for the stability of the vehicle body behavior from among the torques corresponding to the current speed.

Figure 4:
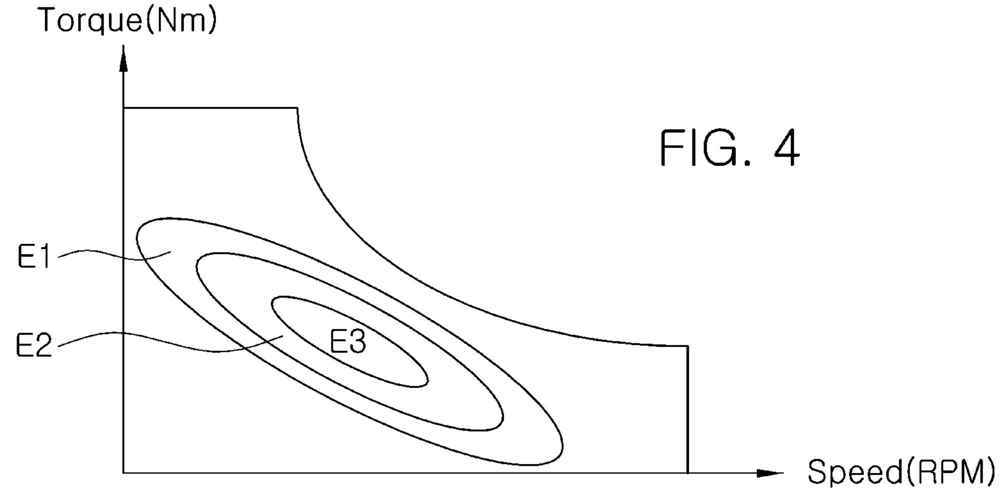
FIG. 4 is a diagram illustrating an efficiency map for determining a second torque value according to an embodiment of the present disclosure.

FIG. 4 is a diagram illustrating an efficiency map for determining a second torque value according to an embodiment of the present disclosure.

Referring to FIG. 4, like the stability map, the efficiency map may be set on a graph having one axis of motor speed and the other axis of motor torque, and it may be divided into a plurality of areas E1 to E3 depending on the degree of motor efficiency.

On the efficiency map shown in FIG. 4, the efficiency of the motor 100 may increase as a value is closer to the area E3 from the area E1, and this efficiency map may enable determination of a torque value that is most advantageous for the efficiency of the motor 100 from among the torques corresponding to the current speed.

Hereinafter, the control process described above will be explained with reference to a flowchart.

Figure 5:
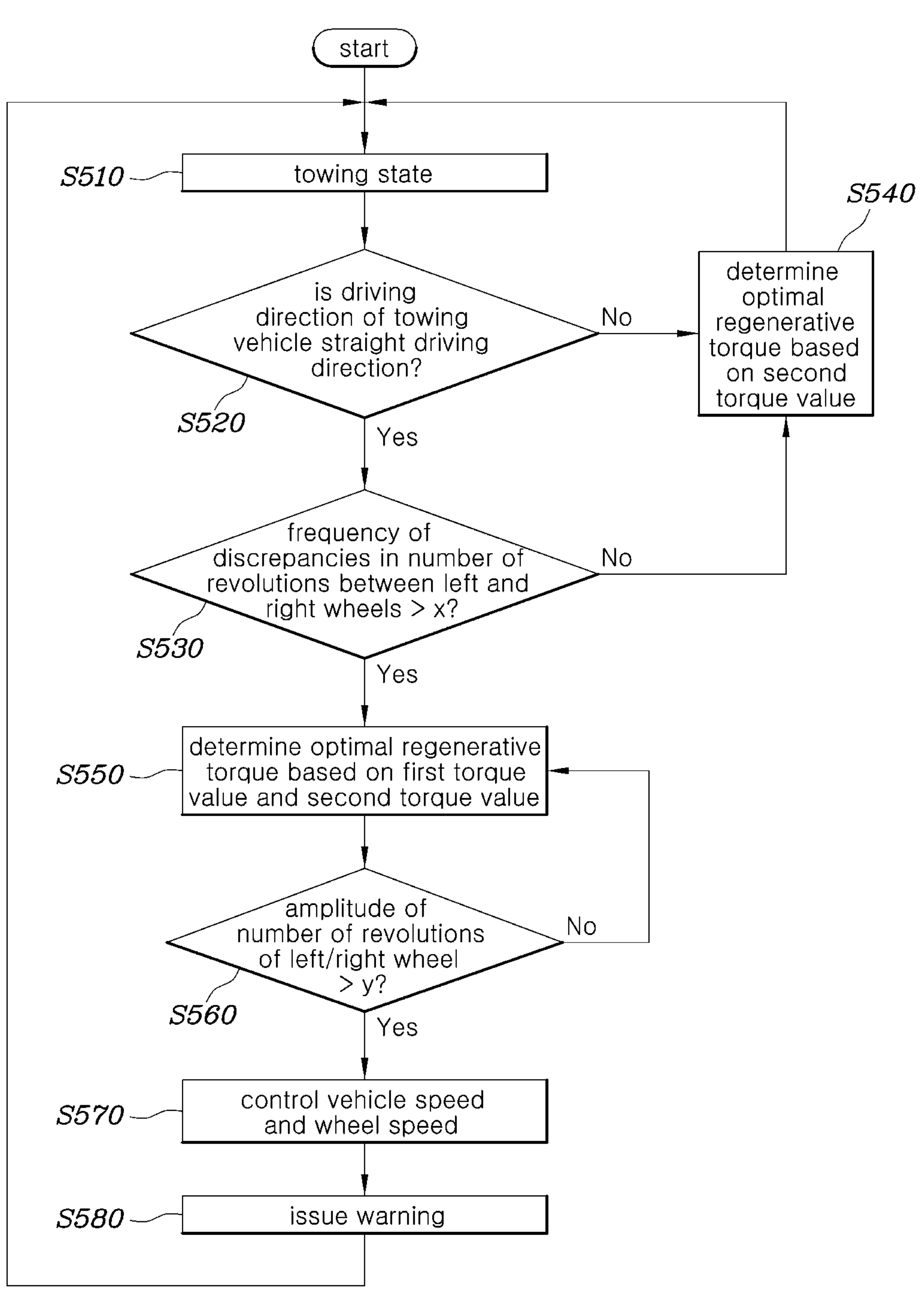
FIG. 5 is a flowchart illustrating a method of controlling an electrified vehicle while being towed according to an embodiment of the present disclosure.

FIG. 5 is a flowchart illustrating a method of controlling an electrified vehicle while being towed according to an embodiment of the present disclosure.

Referring to FIG. 5, first, in the towing state (S510), if the driving direction of the towing vehicle is a straight driving direction (Yes in S520), and if the frequency of discrepancies in the number of revolutions between the left and right wheels of the subject vehicle exceeds a preset frequency X (Yes in S530), the controller 200 may determine target regenerative torque on the basis of a first torque value and a second torque value (S550). In this case, the target regenerative torque may be determined by utilizing both the first torque value and the second torque value, so that the optimal torque may be derived by considering both the stability of the vehicle body behavior and the efficiency of the motor 100.

Otherwise, if the driving direction of the towing vehicle is not the straight driving direction (No in S520), or if the frequency of discrepancies in the number of revolutions between the left and right wheels of the subject vehicle is equal to or less than the preset frequency X (No in S530), the target regenerative torque may be determined based only on the second torque value, and in this case, a torque that maximizes the efficiency of the motor 100 may be derived.

Meanwhile, if the amplitude of at least one of the number of revolutions of the left wheel and the number of revolutions of the right wheel of the subject vehicle exceeds a threshold Y (Yes in S560) during the control of the motor 100 according to the target regenerative torque based on the first torque value and the second torque value, the controller 200 may control at least one of vehicle speed and wheel speed to stabilize vehicle body behavior (S570). In this case, it is possible to decelerate the subject vehicle by controlling the motor 100 to output the maximum torque or operating the brake and to stabilize the vehicle body behavior by alleviating slip occurring in the wheels of the subject vehicle.

Additionally, in this case, the controller 200 may output a preset control signal such that the subject vehicle issues a warning, and as the subject vehicle issues a warning (S580), surrounding vehicles, as well as the occupants inside the subject vehicle, are able to recognize instability of the vehicle body behavior.

According to various embodiments of the present disclosure described above, it is possible to improve driving stability and secure the efficiency of regenerative braking while moving by being towed by another vehicle.

Although embodiments of the present disclosure have been described and illustrated in conjunction with particular embodiments thereof, it will be apparent to those skilled in the art that various improvements and modifications may be made to the embodiments of the present disclosure without departing from the technical idea of the embodiments of the present disclosure defined by the appended claims.

What is claimed is:

1. A method of controlling an electrified vehicle, the method comprising:

in a towing state of the electrified vehicle in which the electrified vehicle is moving by being towed by a towing vehicle, determining a target regenerative torque of a motor provided in the electrified vehicle based on a driving direction of the towing vehicle and a relative state between left and right wheels of the electrified vehicle; and controlling the motor based on the target regenerative torque, wherein the relative state between the left and right wheels of the electrified vehicle includes a number of occurrences per unit time that a discrepancy transitions between positive and negative values through zero in a number of revolutions between the left and right wheels of the electrified vehicle.

2. The method of claim 1, wherein:

the towing state is a state of continuously outputting regenerative torque through the motor in order to charge a battery connected to the motor; and controlling the motor comprises adjusting the regenerative torque output through the motor based on the target regenerative torque.

3. The method of claim 1, wherein determining the target regenerative torque comprises determining the target regenerative torque based on a first torque value determined in consideration of stability of vehicle body behavior in a case in which the driving direction of the towing vehicle is a straight driving direction and a frequency of the discrepancies exceeds a preset value.

4. The method of claim 3, wherein the first torque value is determined by further considering a weight factor determined based on a vehicle speed of the electrified vehicle, weather conditions, or surrounding object detection results.

5. The method of claim 3, wherein determining the target regenerative torque comprises determining the target regenerative torque based on the first torque value and a second torque value determined in consideration of an efficiency of the motor.

6. The method of claim 5, wherein the first torque value is determined by using a stability map preset for a torque and a speed of the motor and, wherein the second torque value is determined by using an efficiency map preset for a torque and a speed of the motor.

7. The method of claim 1, further comprising outputting a preset control signal to cause the electrified vehicle to issue a warning in a state in which the driving direction of the towing vehicle is a straight driving direction, a frequency of the discrepancies exceeds a preset value, and an amplitude of the number of revolutions of the left wheel or the number of revolutions of the right wheel of the electrified vehicle exceeds a preset threshold.

8. The method of claim 1, wherein determining the target regenerative torque comprises determining the target regenerative torque based on a second torque value determined based on an efficiency of the motor in a state in which the driving direction of the towing vehicle is not a straight driving direction or a frequency of the discrepancies is equal to or less than a preset frequency.

9. An electrified vehicle comprising:

a motor; and a controller configured to:

in a towing state of the electrified vehicle in which the electrified vehicle is moving by being towed by a towing vehicle, determine a target regenerative torque of the motor provided in the electrified vehicle based on a driving direction of the towing vehicle and a relative state between left and right wheels of the electrified vehicle; and control the motor based on the target regenerative torque, wherein the relative state between the left and right wheels of the electrified vehicle includes a number of occurrences per unit time that a discrepancy transitions between positive and negative values through zero in a number of revolutions between the left and right wheels of the electrified vehicle.

10. The electrified vehicle of claim 9, wherein:

the towing state is a state of continuously outputting regenerative torque through the motor in order to charge a battery connected to the motor; and the controller is configured to adjust the regenerative torque output through the motor based on the target regenerative torque.

11. The electrified vehicle of claim 9, wherein the controller is configured to determine the target regenerative torque based on a first torque value determined in consideration of stability of vehicle body behavior in a state in which the driving direction of the towing vehicle is a straight driving direction and a frequency of the discrepancies exceeds a preset value.

12. The electrified vehicle of claim 11, wherein the controller is configured to determine the first torque value by considering a weight factor determined based on a vehicle speed of the electrified vehicle, weather conditions, or surrounding object detection results.

13. The electrified vehicle of claim 11, wherein the controller is configured to determine the target regenerative torque based on the first torque value and a second torque value determined in consideration of an efficiency of the motor.

14. The electrified vehicle of claim 13, wherein the first torque value is determined by using a stability map preset for a torque and a speed of the motor and, wherein the second torque value is determined by using an efficiency map preset for a torque and a speed of the motor.

15. The electrified vehicle of claim 9, wherein the controller is configured to control a vehicle speed or a wheel speed of the electrified vehicle in a state in which the driving direction of the towing vehicle is a straight driving direction, a frequency of the discrepancies exceeds a preset value, and an amplitude of the number of revolutions of the left wheel or the number of revolutions of the right wheel of the electrified vehicle exceeds a preset threshold.

16. The electrified vehicle of claim 9, wherein the controller is configured to output a preset control signal to cause the electrified vehicle to issue a warning in a state in which the driving direction of the towing vehicle is a straight driving direction, a frequency of the discrepancies exceeds a preset value, and an amplitude of the number of revolutions of the left wheel or the number of revolutions of the right wheel of the electrified vehicle exceeds a preset threshold.

17. The electrified vehicle of claim 9, wherein the controller is configured to determine the target regenerative torque based on a second torque value determined in consideration of an efficiency of the motor in a state in which the driving direction of the towing vehicle is not a straight driving direction or a frequency of the discrepancies is equal to or less than a preset frequency.

18. A method of controlling an electrified vehicle, the method comprising:

in a towing state of the electrified vehicle in which the electrified vehicle is moving by being towed by a towing vehicle, determining a target regenerative torque of a motor provided in the electrified vehicle based on a driving direction of the towing vehicle and a relative state between left and right wheels of the electrified vehicle;

controlling the motor based on the target regenerative torque, wherein the relative state between the left and right wheels of the electrified vehicle includes a number of occurrences per unit time that a discrepancy transitions between positive and negative values through zero in a number of revolutions between the left and right wheels of the electrified vehicle; and controlling a vehicle speed or a wheel speed of the electrified vehicle in a state in which the driving direction of the towing vehicle is a straight driving direction, a frequency of the discrepancies exceeds a preset value, and an amplitude of the number of revolutions of the left wheel or the number of revolutions of the right wheel of the electrified vehicle exceeds a preset threshold.

19. The method of claim 18, wherein determining the target regenerative torque further comprises considering a weight factor determined based on at least one of a vehicle speed of the electrified vehicle, weather conditions, or surrounding object detection results obtained from sensors including cameras, radar, or lidar.

20. The method of claim 18, wherein the towing state comprises a state of continuously outputting regenerative torque through the motor in order to charge a battery connected to the motor, and wherein controlling the motor comprises adjusting the regenerative torque output through the motor based on the target regenerative torque.

* * * * *